United States Patent [19]

Stech

[11] Patent Number: 5,287,906
[45] Date of Patent: Feb. 22, 1994

[54] AIR CONTROL SYSTEM FOR PNEUMATIC TIRES ON A VEHICLE

[75] Inventor: Clyde G. Stech, Weimar, Tex.

[73] Assignee: Equalaire Systems, Inc., Corpus Christi, Tex.

[21] Appl. No.: 951,297

[22] Filed: Sep. 22, 1992

Related U.S. Application Data

[63] Continuation of Ser. No. 524,420, May 17, 1990, abandoned.

[51] Int. Cl.⁵ .............................................. B60C 23/00
[52] U.S. Cl. ........................................ 152/417; 141/38
[58] Field of Search ...................... 152/415, 416, 417; 285/33; 403/DIG. 4; 303/84.2; 141/38

[56] References Cited

U.S. PATENT DOCUMENTS

| | | | |
|---|---|---|---|
| 2,693,841 | 11/1954 | Webster, Jr. | 152/417 |
| 3,100,655 | 8/1963 | Work | 285/33 |
| 4,387,931 | 6/1983 | Bland | 152/416 |
| 4,431,043 | 2/1984 | Goodell et al. | 152/417 |
| 4,678,017 | 7/1987 | Schultz | 152/416 |
| 4,685,501 | 8/1987 | Williams | 152/415 |
| 4,844,138 | 7/1989 | Kokubu | 152/417 |
| 4,932,451 | 6/1990 | Williams et al. | 152/415 |

Primary Examiner—Michael W. Ball
Assistant Examiner—Francis J. Lorin
Attorney, Agent, or Firm—Fulbright & Jaworski

[57] ABSTRACT

An air control system which is connected to the conventional air supply on a truck is continuously connected to the truck tires and provides equal pressure to all of the tires through a regulator. The air connection between the regulator and each tire is through a rotatable joint in the truck axles for allowing rotation of the wheels while connected to the air control system.

3 Claims, 3 Drawing Sheets

AIR CONTROL SYSTEM FOR PNEUMATIC TIRES ON A VEHICLE

This application is a continuation of application Ser. No. 07/524,420, filed May 17, 1990, abandoned.

BACKGROUND OF THE INVENTION

The present invention is directed to an air control system for controlling the inflation pressure of tires on a vehicle, such as a truck-trailer. It is known that tires should be properly inflated for ease of control of the vehicle and consequently its safety, and to provide even wear and long life of the expensive tires. While the truck drivers may periodically check their tires, they frequently do not take the time or effort to insure that the tires are properly inflated and they are frequently unaware when an inflation problem occurs. In some instances, even a blowout on an 18 wheeler may remain unnoticed until the adjacent tire is ruined.

The present invention is directed to an air control system for pneumatic tires on a vehicle which is continuously connected to the conventional air supply on the vehicle for supplying equal pressure to all of the tires and providing an indication of a problem.

SUMMARY

The present invention is directed to an air control system for a vehicle having a plurality of axles with wheels having pneumatic tires and the vehicle includes an air supply. The system includes an air line connected to the air supply and a regulator is connected to the air line for supplying regulated air to the tires. An air connection is provided between the regulator and each tire for supplying regulated air to each tire and a rotatable joint is provided in the air connection for allowing rotation of the wheels while connected to the air control system. The air connection extends through the axles and the rotatable joint is concentric with the axle.

A further object of the present invention is wherein the air line includes a valve and a valve is preferably a check valve for isolating the air control system from the vehicle air supply.

Still a further object of the present invention is wherein the air connection includes a check valve adjacent each tire and preferably the air connection includes a quick disconnect adjacent the check valve for ease of disconnecting the system for repair of a tire.

Yet a still further object of the present invention is wherein the air connection includes an unloader valve adjacent the regulator for closing the air connection in the event of a pressure loss in the air connection for protecting the vehicle air supply.

Still a further of the present invention is wherein the air connection includes a test valve stem between each check valve and tire for checking air pressure in the tire if desired.

Yet a still further object of the present invention is wherein the vehicle includes two wheels and tires at each end of the axle and the air connection to each set of two wheels includes a T-shaped connection connected to each set of two wheels for providing a generally balanced connection when the wheels are rotating.

Still a further object of the present invention is wherein the air connection extends through the axles and the wheels and will provide continuous air connection to the wheels, but can be easily disconnected to repair or replacement of the tires.

Other and further objects, features and advantages will be apparent from the following description of a presently preferred embodiment of the invention, given for the purpose of disclosure, and taken in conjunction with the accompanying drawings.

DESCRIPTION OF THE PREFERRED EMBODIMENT

Figure 1:
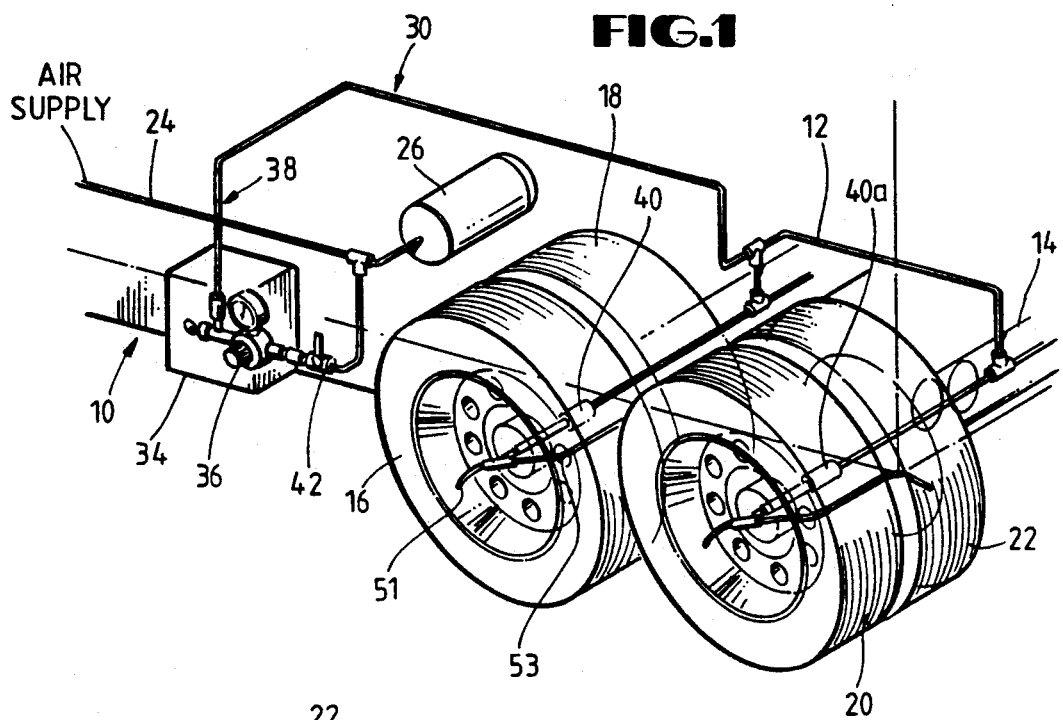
FIG. 1 is a fragmentary, perspective elevational view of the present invention installed in a truck-trailer.
Figure 2:
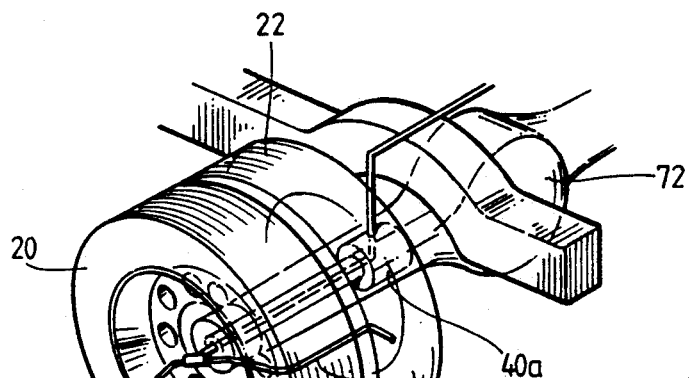
FIG. 2 is a fragmentary, perspective view of the connection of the air control system of the present invention to two tires at the end of an axle.

Referring now to the drawings, and particularly to FIG. 1, the reference numeral 10 generally indicates a conventional vehicle, such as an 18-wheel truck-trailer, having a plurality of axles 12 and 14 with wheels having pneumatic tires. Thus, axle 12 includes two tires 16 and 18 at one end and axle 14 includes two tires 20 and 22 at one end. As is conventional, similar tires are at the second end of the axles 12 and 14. Such a vehicle 10 also includes an air supply line 24 from a pump (not shown) and an air tank 26 for supplying air pressure to the brakes on the vehicle 10.

The above description of a vehicle 10 with pneumatic tires and a conventional air supply system is well known. The present invention is directed to providing an air control system 30 which is continuously connected to all of the pneumatic tires including 16, 18, 20 and 22 on the vehicle 10 to provide an equal pressure thereby improving the safety of the vehicle 10, and to provide even wear and long life of the expensive tires. The air control system of the present invention is generally indicated by the reference numeral 30 and generally includes an air line 32 connected to the vehicle air supply 24, a control box 34 which includes an air regulator 36, an air connection generally indicated by the reference numeral 38, between the regulator 36 and each tire 16, 18, 20 and 22, and a rotatable joint 40 or 40a in the air connection 38 for allowing rotation of the wheels while connected to the air control system 30.

Figure 6:
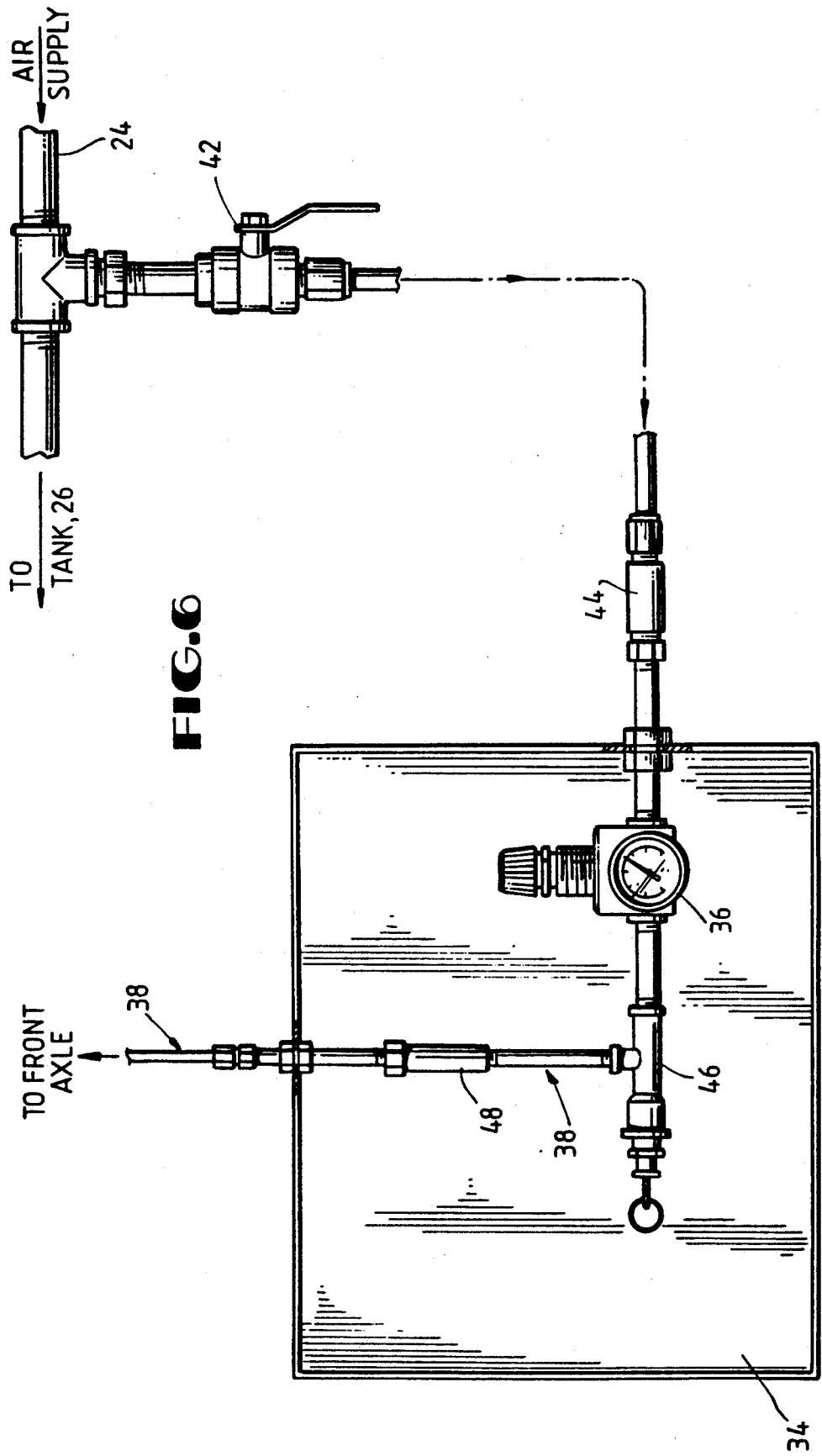
FIG. 6 is an enlarged, elevational view illustrating the control box of the present invention.

Referring now to FIGS. 1 and 6, the air control system 30 of the present invention includes the air line 32 which is connected to the normal truck air supply 24. A typical truck air supply may have 120 psi air pressure. Preferably, the air line 32 includes a manual off/on valve 42 for manually connecting or disconnecting the air control system 30 of the present invention to the vehicle air supply 24. Additionally, the air line 32 may include a check valve 44 which allows the passage of the air through the air line 32 to the regulator 36, but prevents reverse flow of air. The check valve 44 is for protecting the air pressure in the tires when the truck is shut down. The air pressure regulator 36 may be of any conventional type and is typically set at between 108-110 psi as this is the normal air pressure carried in the truck-trailer tires of an 18-wheel truck-trailer. One satisfactory type of air regulator is Model 56-110, sold by Air Drco.

The air connection generally indicated by the reference numeral 38 between the pressure regulator 36 and each of the tires 16, 18, 20 and 22 includes various components and features which are useful and convenient in maintaining equal air pressure in each of the tires, allowing the tires to be easily repaired, and preventing disablement of the air supply 24, which is required for the air brakes on the truck. The air connection 38 may include an unloader valve 46 which is normally open, but closes in the event that the output air pressure from the pressure regulator 36 falls below a predetermined value. For instance, the unloader valve 46 may be set to close in the event that the pressure in the air connection 38 falls below 80 psi. This prevents any further loss of supply air from the supply system 24, thereby protecting the air supply 24 and allowing it to maintain sufficient air pressure to actuate the air brakes on the vehicle 10. One suitable unloader valve is No. 3X818, sold by Control Devices, Inc. In addition, a conventional air filter 48 may be provided in the air connection 38 to provide clean air to the system and prevent any particles from interfering with the operation of the control system 30.

Figure 4:
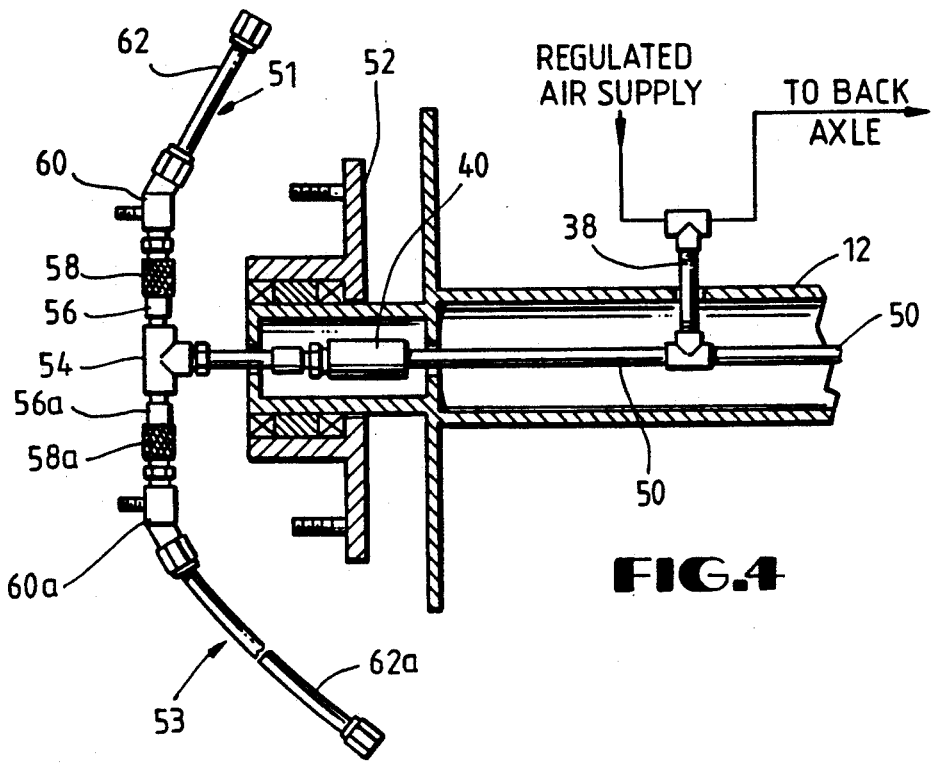
FIG. 4 is a fragmentary, elevational view, partly in cross section and schematic, illustrating the air connection through one type of axle such as a back axle of a truck-trailer.

Referring now to FIG. 4, in which a front or fixed axle 12 is shown, the air connection 38 is supplied from the outside of the axle 12 through a fixed line 50 which is preferably coaxially positioned in the axle 12 and through the wheel hub 52. The line 50 is connected to the rotatable connection 40 which is a rotatable joint which allows rotation of the end of the air supply connection as the tire rotates. One suitable type of rotatable joint is a rotatable union model 1115 sold by Deublin. Thus, the rotating joint 40 is connected through the fixed air line 50 on one side and the other side is connected to a rotatable connection which includes a tee 54 having first 51 and second 53 similar tire connections for two tires, such as 16 and 18. Thus connected to the outside tire, such as tire 16, is a connection 51 consisting of preferably a male 56 and female 58 connectible and disconnectible coupling for conveniently disconnecting the tire 16 from the system 30 for replacement or repair. Also, the tire connection 51 includes a test valve stem 60 for testing the air in the tire 16. A flexible hose 62 completes the connection 51 to the valve stem of the outside of the tire 16. Preferably, the normal dill valve in the tires are removed and instead a conventional check valve, such as Model MJCV-1, sold by Control Devices, Inc. is included in the male connector 56 as such a check valve will be longer lasting that the normal dill valve. The tire connection 53 to the inside wheel 18 is also connected to the tee 54 and includes similar parts to those in the tire connection to the tire 16 which are similarly numbered with the addition of the suffix "a".

Figure 3:
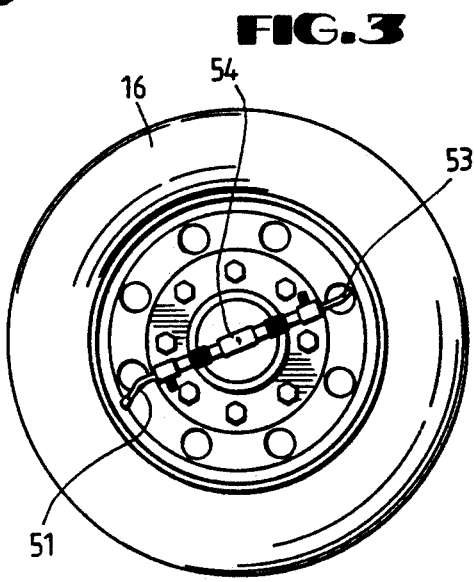
FIG. 3 is an enlarged end elevational view illustrating the connection of the air control system to the two tires of FIG. 2.

It is noted that the tire connections 51 and 53 are connected to the opposite sides of the rotating tee connection 54. While the tire connection 53 to the inside tire 18 may be slightly longer than the tire connection 51 to the outside tire 16, the tire connections 51 and 53 are generally balanced for rotation. While the tire connection 51 goes directly to the tire stem in the tire 16, the tire connection 53 goes through the tire 16 as best seen in FIGS. 1 and 3.

It is noted in FIG. 4 that the line 50 also extends towards the opposite ends of the fixed axle 12 to supply regulated air to the two tires and wheels at the other end of the axle 12.

Figure 5:
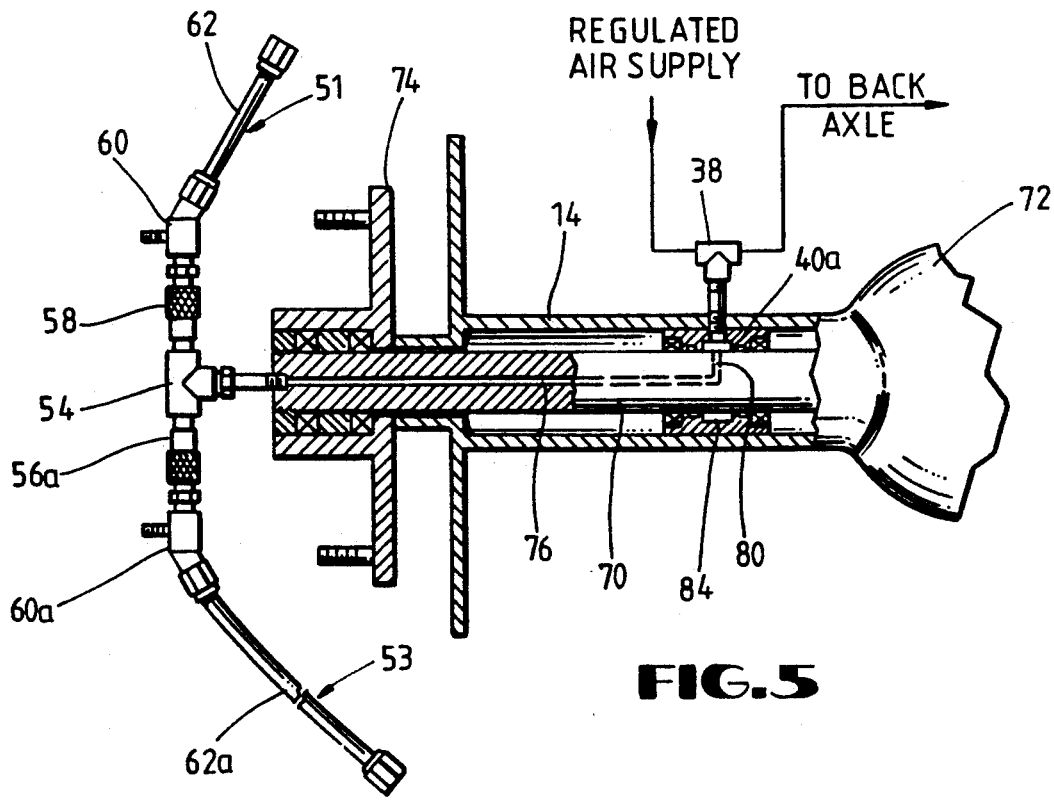
FIG. 5 is a fragmentary, elevational view, partly in cross section and partly schematic, illustrating the connection of the air supply system to a different type of axle.

While the axle 12 described in FIGS. 1 and 4 is fixed, the present invention may also be connected to and used with axles 14 having rotating shafts 70 (FIG. 5) therein driven by a conventional transmission 72 for driving wheel 74. In this case, an air passageway 76 is drilled coaxially through the rotatable shaft 70. The passageway 76 ends in a port 80 which is connected to an air union 40a which in turn is connected to the fixed air connection 32. The union 40a includes an annular chamber 84 for supplying a continuous supply of air from the connection 32 to the air passageway 76. One suitable type of rotatable joint is the "Around-The-Shaft" union sold by Deublin. Thus, while the shaft 70 rotates, the union 40a remains fixed and supplies air to the tires 20 and 22. The tire connections 51 and 53 to the tires 20 and 22 are identical to the tire connections 51 and 53 in FIG. 4.

In use, the air control system 30 of the present invention is installed in a vehicle 10 as described. The hand valve 42 is opened and air from the vehicle air supply 24 is supplied to the pressure regulator 36, at an inlet pressure of typically 120 psi. The outlet air pressure supplied from the pressure regulator to the air connection 38 is normally 108-110 psi. Thus, the air will flow through the air connections 38 through the rotatable joints 40 and 40a, and to the rotating tee connections 54 to the tire connections 51 and 53 which are continuously connected to and continuously supply air to all of the tires 16, 18, 20 and 22 of the vehicle 10. The air is supplied through check valves in each of the tire connections 51 and 53. As long is the system operates satisfactorily, the unloader valve 46 will remain in the open position supplying regulated pressure to the tires. In normal operation, the system 30 will maintain all of the tires with equal pressure. If the operator desires to check the pressure in the tires, this may be done by testing at the valve stems 60 or 60a for the desired tire. In the event that one of the tires needs to be repaired or replaced, the manual valve 42 is closed disconnecting the system 30 from the vehicle air supply and the individual tires can be disconnected from the air supply system 30 by disconnecting the quick connect/disconnect couplings 56-58 or 56a-58a as appropriate. The remainder of the tires will remain inflated through their connected check valve in their individual tire connection.

In the event that a blowout occurs, the air will, of course, be continued to be supplied to the blown out tire causing a drop in the output pressure from the pressure regulator 36. When the pressure in the air connection 38 drops to a predetermined value, such as 80 psi, the unloader valve 46 will close, thereby preventing loss of any further air from the vehicle air supply 24. If desired, an alarm system can be added to the vehicle 10 air supply, if there is not one, to indicate when the air supply falls below a predetermined amount. However, trucks 10 normally have gauges in the cab of the truck which already indicate the pressure in the air supply. This will provide a warning to the operator of a problem so that he can check the problem before the adjacent tire to the blown out tire is also damaged.

The present invention, therefore, is well adapted to carry out the objects and attain the ends and advantages mentioned as well as others inherent therein. While a presently preferred embodiment of the invention has been given for the purpose of disclosure, numerous changes in the details of construction and arrangement of parts will be readily apparent to those skilled in the art and which are encompassed within the spirit of the invention and the scope of the appended claims.

What is claimed is:

1. An air control system for a truck vehicle having a plurality of axles with at least one wheel having a pneumatic tire at each end of the axles and said truck having an air supply wherein the air supply has a predetermined outlet pressure, the system comprising, an air line connected to the air supply, a pressure regulator connected to the air line for supplying substantially constant regulated air to the tires, an air connection between the regulator and each tire for supplying regulated air to each tire, said air connection extends through the axles and said air connection includes a rotatable pipe union having first and second parts sealably and rotatable relative to each other and positioned inside the axles for allowing rotation of the wheels while connected to the air control system, at least one check valve in the air connection downstream of the regulator allowing downstream flow but preventing upstream flow from the tires, and an unloader valve in the air connection downstream of the regulator and upstream of all of the tires, said unloader valve being normally open for supplying air to all of the tires and having a predetermined setpoint pressure lower than the predetermined outlet pressure, said unloader valve closing on a drop in outlet pressure of the air supply below the predetermined setpoint thereby shutting off air to all of the tires for preventing further loss of air from the air supply and opening upon an increase in outlet pressure of the air supply above said predetermined setpoint.

2. The apparatus of claim 1 including a check valve upstream of the regulator.

3. The apparatus of claim 1 including a nonthreaded quick disconnect coupling adjacent each tire.

* * * * *